UNITED STATES PATENT OFFICE.

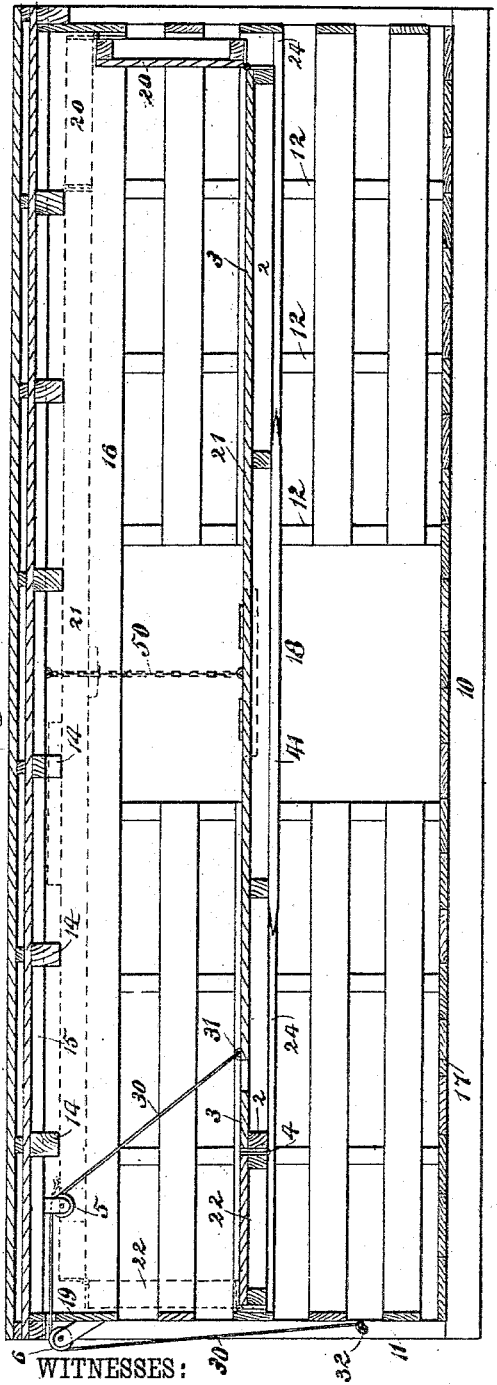

LOUIS HAMLIN WHITE, OF ST. AUGUSTINE, FLORIDA.

STOCK-CAR.

SPECIFICATION forming part of Letters Patent No. 356,910, dated February 1, 1887.

Application filed September 18, 1886. Serial No. 213,928. (No model.)

*To all whom it may concern:*

Be it known that I, LOUIS HAMLIN WHITE, of St. Augustine, in the county of St. John's and the State of Florida, have invented a new and Improved Stock-Car, of which the following is a full, clear, and exact description.

This invention relates to the construction of a car wherein the parts are so arranged that the car may be quickly and easily changed from a single to a double floored car, the object of the invention being to provide a car which may be used either for the transportation of cattle or for the transportation of sheep, hogs, or other small animals; and to this end the invention consists of a car provided with a movable auxiliary or upper floor, as will be hereinafter explained, and specifically pointed out in the claims.

Reference is to be had to the accompanying drawings, forming a part of this specification, in which similar figures of reference indicate corresponding parts in all the views.

Figure 1 is a central longitudinal sectional view of my improved form of stock-car, the auxiliary floor being shown in full lines in its lower position and in dotted lines in its raised position. Fig. 2 is a cross-sectional view of the car; and Fig. 3 is a detail view upon an enlarged scale, representing a portion of one side of the car, the view being given to illustrate the construction of the hoisting apparatus.

In the drawings, 10 represents the sills, 11 the corner-posts, 12 the body-posts, 13 the plates, 14 the carlings, 15 the ridge-pole, 16 the side facing-plates, 19 the end facing-plates, and 17 the main floor, of the car. The car is provided with the usual facing-strips and with side doors, 18. In fact, my invention could be used in connection with any ordinary form of freight or cattle car.

To one end of the facing-plates 19 there is hinged a heavily-made flap or leaf, 20, to which there is in turn hinged a platform, 21, which is made up of a rectangular frame, 2, and floor-boards 3, the frame 2 being properly braced, as will be readily understood. A second flap, 22, is hinged to the other end of the platform 21 by hinges 4, the leaves of which extend upward, and this flap 22 is hinged to the end of the car at a point just in line with the surface of the platform when the platform is in the lowered position.

The platform 21, which constitutes the auxiliary floor of the car, normally rests in the position in which it is shown in full lines, being supported by cleats 24, as clearly illustrated; but when the car is to be cleared for the purpose of transporting cattle the platform 21 is drawn to the position in which it is shown in dotted lines, this movement being brought about through the medium of a chain or rope, 30, one end of which is secured to an eyebolt, 31, the rope passing thence over sheaves 5 and 6, located as illustrated, and finally down to a shaft, 32, that is preferably mounted at one end of the car.

The shaft 32 carries a hand-wheel, 33, and a ratchet, 34, said ratchet being engaged by a pawl, 35, that is normally held in engagement with the ratchet by a spring, 36. The pawl 35 is formed with a long arm, 37, and when this arm is thrown in the direction of the arrow and brought into engagement with a stop, 38, the pawl will be thrown out of engagement with the ratchet.

To draw the platform 21 up, an attendant grasps and turns the hand-wheel 33, thus winding the rope or chain 30 upon the shaft 32, and drawing the platform 21 and its leaves 20 and 22 to the position in which they are shown in dotted lines in Fig. 1. When the platform is to be lowered, the handle 37 of the pawl 35 is moved so as to release the pawl from engagement with the ratchet, when the weight of the platform causes it to drop to its lower position.

Side flaps, 40, are hinged to the platform 21, and arranged to drop into the space between the doors and the side edges of the platform after the platform has been lowered; but when the platform is to be raised the flaps 40 are folded up so that they rest on the upper surface of the platform.

The chain 50, which passes through the platform 21 and is secured to a strip, 41, and to the ridge-pole of the car, acts to steady and support the center of the platform.

Having thus fully described my invention, I claim as new and desire to secure by Letters Patent—

1. The combination, with a car, of a platform consisting of three sections, one end section being hinged to the lower face and the other to the upper face of the central section, and both of the said end sections hinged to the ends of the car in different horizontal planes, substantially as herein shown and described.

2. The combination, with a car, of leaves 20 and 22, that are hinged to the car, a platform, 21, hinged to the leaves, a rope or chain, 30, and a mechanism, substantially as described, whereby the rope may be wound upon a drum and the platform moved to clear the body of the car.

3. The combination, with a car, of leaves 20 and 22, hinged thereto, a platform, 21, hinged to the leaves, side flaps, 40, hinged to the platform 21, and a hoisting mechanism, substantially as described.

LOUIS HAMLIN WHITE.

Witnesses:
STEPHEN CANERA,
B. F. OLIVER.